United States Patent [19]

Cosman

[11] Patent Number: 5,579,456
[45] Date of Patent: Nov. 26, 1996

[54] DIRECT RENDERING OF TEXTURED HEIGHT FIELDS

[75] Inventor: Michael A. Cosman, South Jordan, Utah

[73] Assignee: Evans & Sutherland Computer Corp., Salt Lake City, Utah

[21] Appl. No.: 564,820

[22] Filed: Nov. 29, 1995

Related U.S. Application Data

[63] Continuation of Ser. No. 137,907, Oct. 15, 1993, abandoned.

[51] Int. Cl.$^6$ .................................................. G06T 15/00
[52] U.S. Cl. ........................ 395/128; 395/119; 395/127; 395/121
[58] Field of Search ................................. 395/119, 121, 395/127–129

[56] References Cited

U.S. PATENT DOCUMENTS

| | | | |
|---|---|---|---|
| 3,764,719 | 10/1973 | Dell | 35/10.4 |
| 4,017,985 | 4/1977 | Heartz | 35/10.4 |
| 4,241,519 | 12/1980 | Gilson et al. | 9/8 |
| 4,343,037 | 8/1982 | Bolton | 364/521 |
| 4,583,185 | 4/1986 | Heartz | 364/521 |
| 4,807,158 | 2/1989 | Blanton et al. | 364/521 |
| 4,821,212 | 4/1989 | Heartz | 395/163 |
| 4,855,937 | 8/1989 | Heartz | 395/127 |
| 4,940,972 | 7/1990 | Mouchot et al. | 395/121 |
| 5,103,306 | 4/1992 | Weiman et al. | 358/133 |
| 5,179,638 | 1/1993 | Dawson et al. | 395/121 |
| 5,317,689 | 5/1994 | Nack et al. | 395/126 |

*Primary Examiner*—Heather R. Herndon
*Assistant Examiner*—Rudolph Buchel
*Attorney, Agent, or Firm*—Darby & Darby P.C.

[57] ABSTRACT

To create a dynamic textured display, images of textured height fields (elevation samples arrayed on a rectangular coordinate grid, as to represent a terrain) are rendered, the system performing an initial pass that re-samples the height-field data into a radial form and a subsequent pass using the radial data to create textured, shaded picture elements (pixels) for an instantaneous field of view. Thus, texturing, shading, blending and scan conversion complete the pixel processing to drive a display unit. The system is particularly applicable to the generation of dynamic perspective images of terrain. The process provides pixel-limited textural resolution in the final image with effective antialiasing of internal and horizontal silhouette edges.

26 Claims, 10 Drawing Sheets

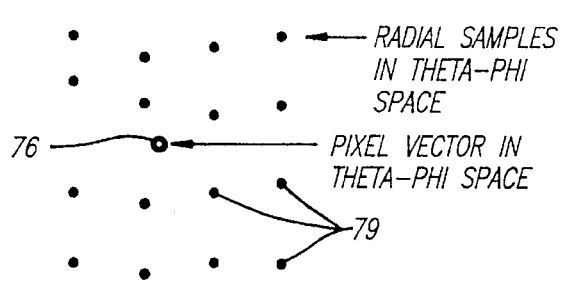
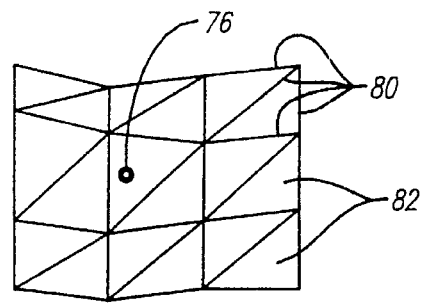
FIG. 8
FIG. 9
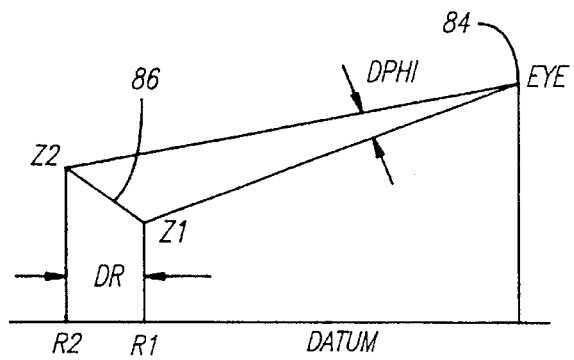
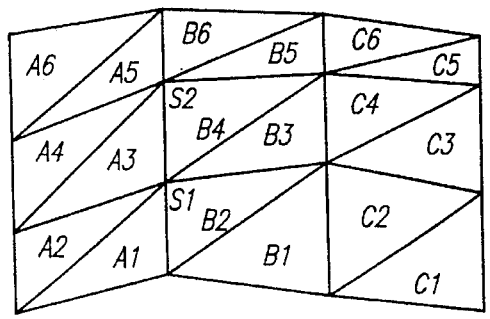
FIG. 11
FIG. 12
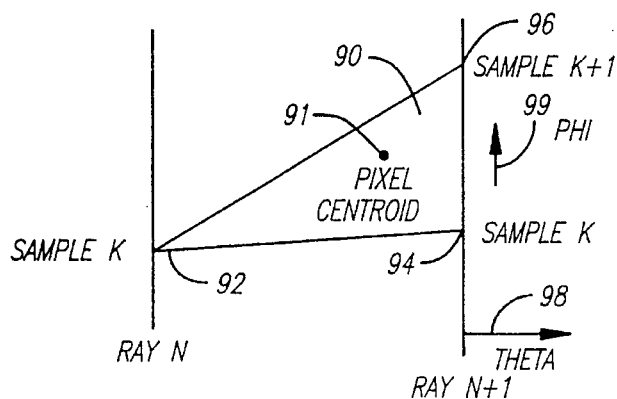
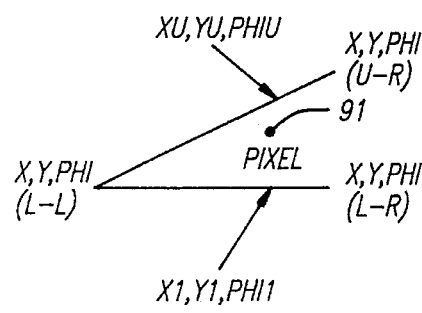
FIG. 13
FIG. 14

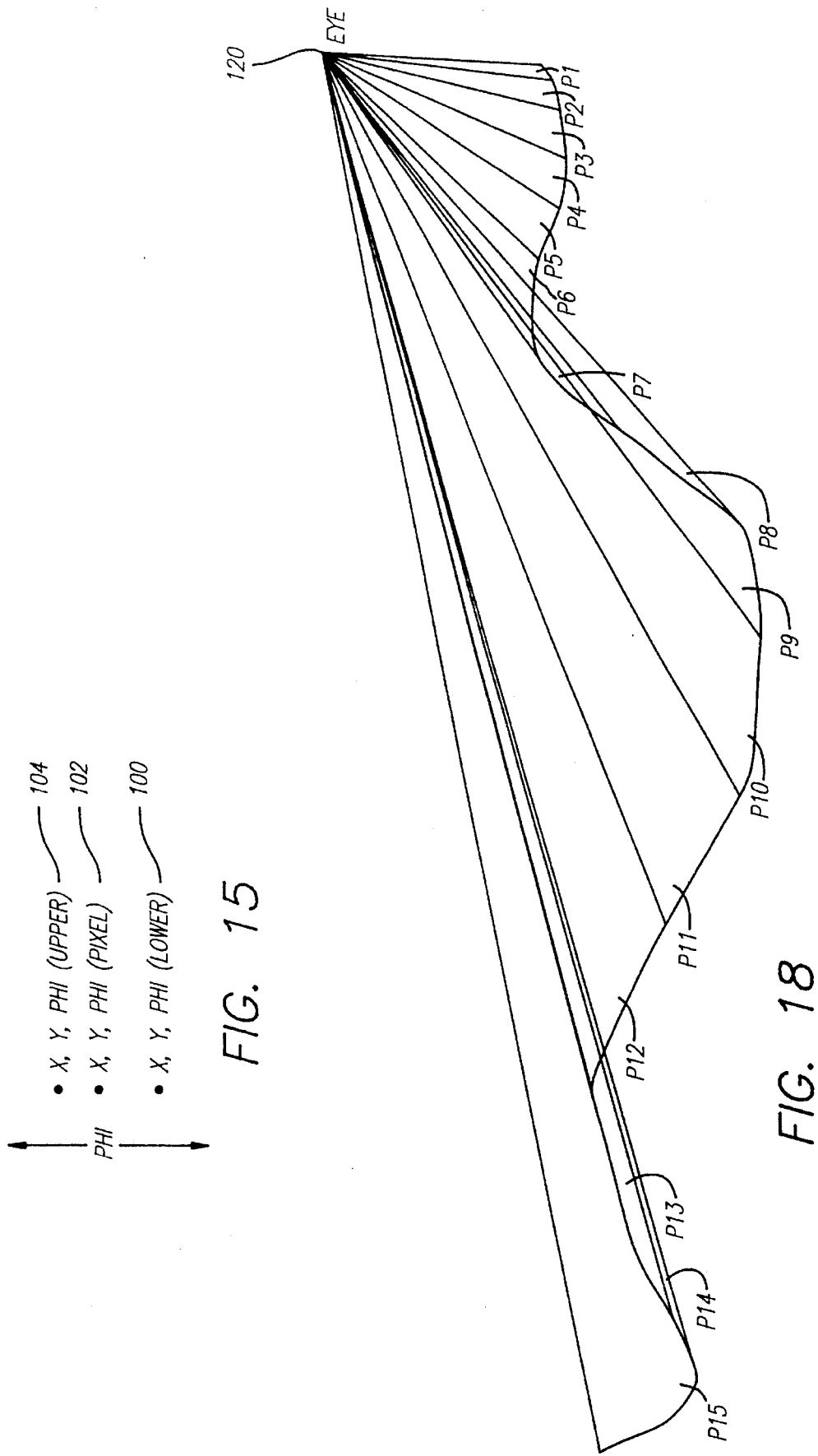

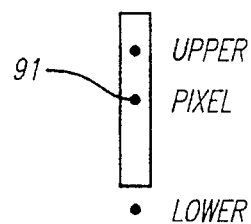
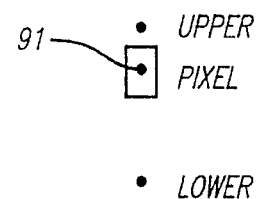
FIG. 16a        FIG. 16b
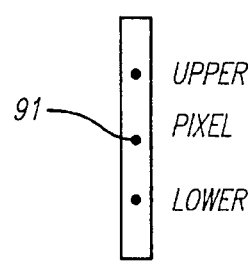
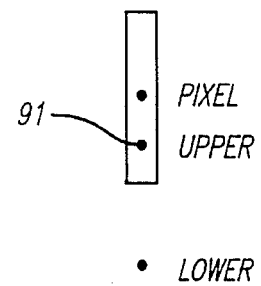
FIG. 16c        FIG. 16d
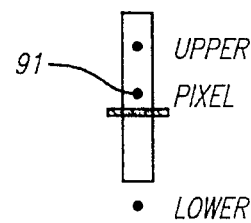
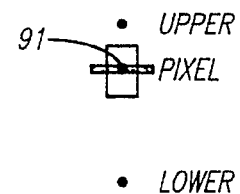
FIG. 17a        FIG. 17b
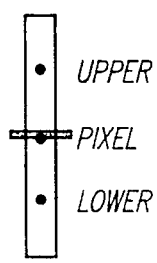
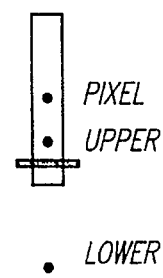
FIG. 17c        FIG. 17d

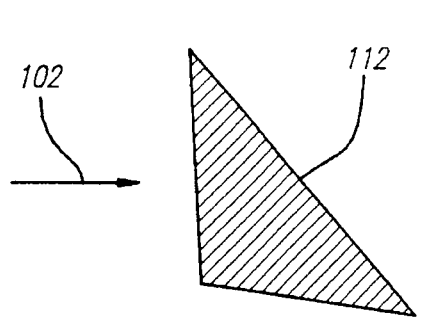
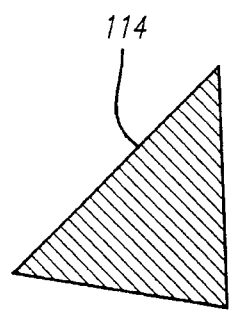
FIG. 19a      FIG. 19b
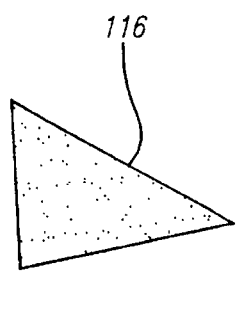
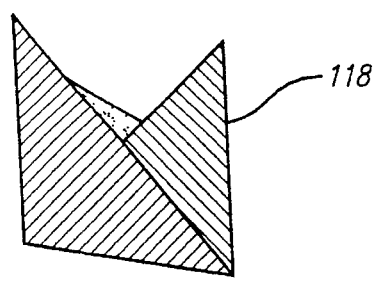
FIG. 19c      FIG. 19d
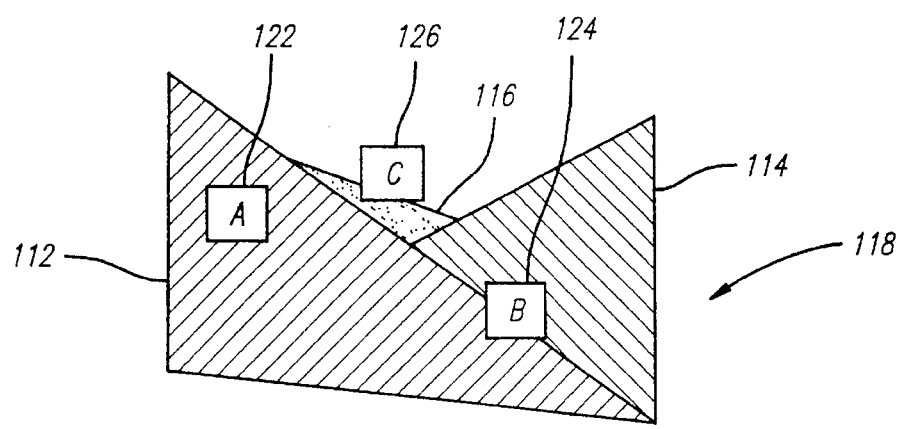
FIG. 20

DIRECT RENDERING OF TEXTURED HEIGHT FIELDS

RELATED SUBJECT MATTER

This application is a continuation of application Ser. No. 08/137,907, now abandoned, filed Oct. 15, 1993, entitled "DIRECT RENDERING OF TEXTURED HEIGHT FIELDS."

FIELD OF THE INVENTION

The present invention relates to a system for generating real time dynamic images on a display device representative of perspective scenes such as the terrain below an aircraft.

BACKGROUND OF THE INVENTION

Over the years, significant advances have been made in the field of computer graphics. Generally, by utilizing data from an extensive source, in cooperation with various control parameters, dynamic pictures are displayed as to reveal a traversed terrain. Typically, an image generator functions in cooperation with a cathode ray tube display system to provide such dynamic images and visually simulate actual experiences. In one form, such systems have been widely used in simulators for visually training pilots or other operators.

Utilizing one technique, computer image generators process elevation and texture data to provide dynamic, perspective graphic images. While systems have been proposed for displaying such images of terrain, a need continues to exist for improved systems providing displays with sharp, well-defined texture and ridge edges somewhat independent of terrain orientation and with reduced data processing. Additionally, it is important to minimize discernable motion artifacts in such displays.

Typically, elevation and planimetric data for use by an image generator to provide a display is available in a rectangular-coordinate format, e.g. a height field. Conventionally, the height field consists of elevation samples arrayed at coordinate points in a rectangular grid aligned with X-Y datum. Each elevation value at a coordinate point manifests the Z height of the terrain or skin at that X-Y position. Generally, a height field is particularly efficient for representing a complex surface because the X-Y position of each height sample or Z value is imputed from the position or sequence of the height value in the array. Accordingly, the number of elements along each axis and the spacing of the elements need be remembered only once for the entire array; only the Z values are actually stored at each coordinate point or array position, saving two-thirds of the storage. Since only one height value is stored for each position in the array, the field is "single-valued" at every position. The implicit surface or skin associated with the height field thus is non-overlapping in Z, an attribute that is useful herein.

Generally, the system of the present invention involves re-sampling the rectangular coordinate height-field data into a radial form with the establishment of azimuth and range values. A skin or terrain representation is accordingly defined in a radial form and is processed to select samples effecting each picture element (pixel) of a selected viewpoint display. The elevation is then computed in eye space for each radial sample using coordinates of both space formats to generate a basic form of the image that is then textured, shaded and scan converted for display.

Re-sampling the height field data into a radial form is performed in the X-Y coordinates. In the disclosed embodiment, filtering accommodates offset between the two coordinate systems. Pixels are processed from the radial data, again with filtering to attain generally improved image characteristics. Appropriate antialiased texturing, shading and scan conversion operations complete the processing to provide effective pixel display data for a perspective dynamic image display.

BRIEF DESCRIPTION OF THE DRAWINGS

In the drawings, which constitute a part of this specification and in which like reference numerals indicate like parts, exemplary embodiments of the present invention exhibiting various objectives and features thereof are set forth, Specifically:

FIG. 8 is a sectional view of an image data pattern shown with reference to a picture element;

FIG. 9 is a graphic representation of an interconnection format to provide polygons;

FIG. 11 is a graphic representation showing a data representing edge for processing in accordance herewith;

FIG. 12 is a graphic representation illustrating the processing of polygons in accordance herewith;

FIG. 13 is a graphic representation illustrating the filtering process step as disclosed herein;

FIG. 14 is an alternative view similar to FIG. 13;

FIG. 15 is still another graphic representation of filtering in accordance herewith;

FIG. 16A–16D are graphic representations illustrating an exemplary filtering operation in accordance herewith;

FIG. 17A–17D are views similar to FIG. 16 illustrating a texturing operation;

FIG. 18 is a somewhat perspective view illustrating patch processing operations in accordance herewith;

FIG. 19A–19D are graphic representations of polygon processing in accordance with the process hereof;

FIG. 20 is a graphic representation of composite polygon processing in accordance herewith;

DETAILED DESCRIPTION OF THE DISCLOSED EMBODIMENT

Figure 1:
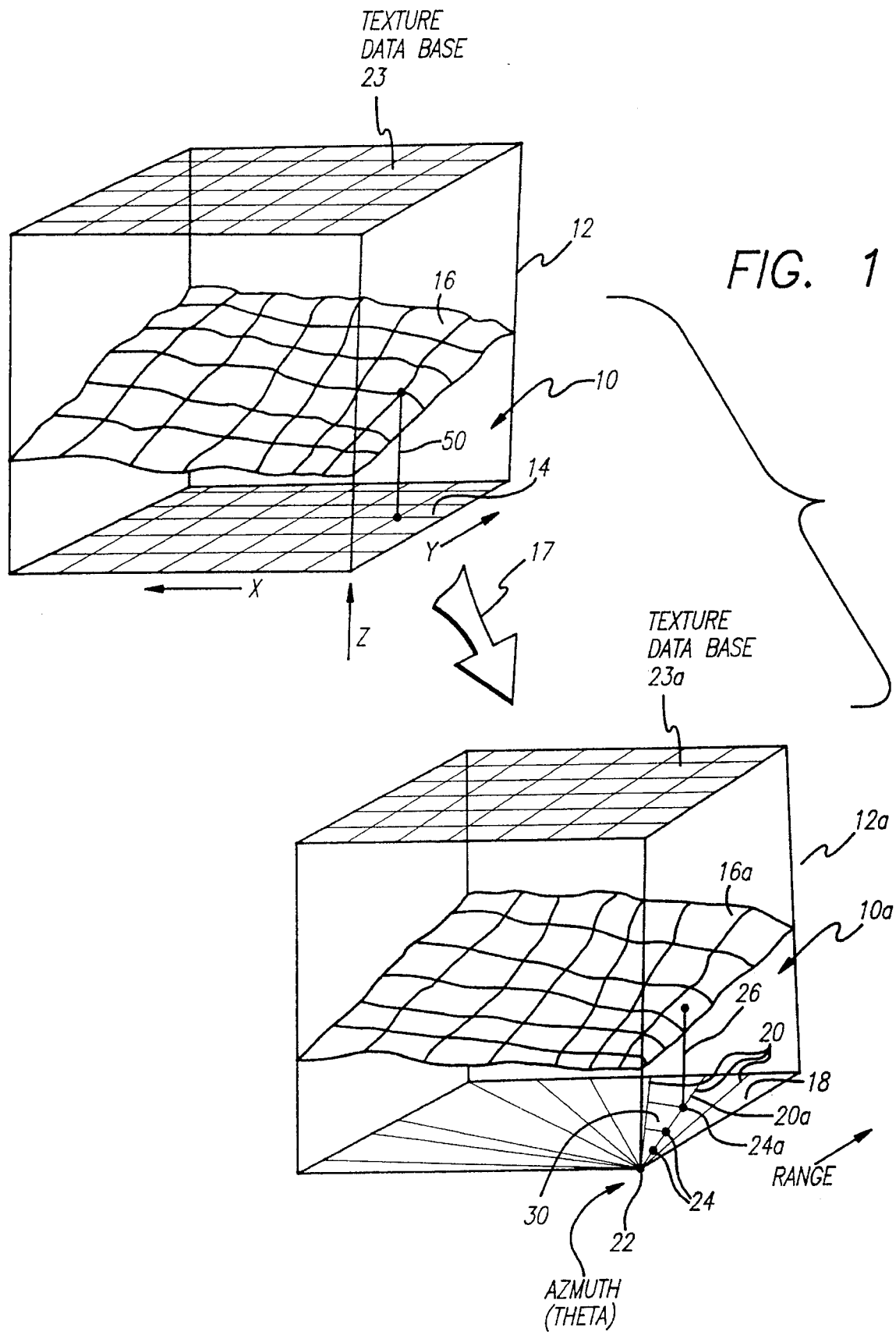
FIG. 1 is a diagrammatic illustration of a data re-sampling operation to be executed in accordance herewith.

As indicated above, a significant aspect of the system of the present invention is based on re-sampling height-field data into a radial form. A rectangular fragment 10 of a height field is illustrated in a cube 12 to enhance the illustration. The represented field is shown on a rectangular X-Y grid 14 with a skin 16 crosshatched to illustrate a terrain or surface. Simply for purposes of illustration, a grid 14 is designated in X (horizontal) and Y (vertical) coordinate dimensions, with the height dimension Z indicated.

While the fragment 10 is illustrative, it is to be understood that the height field data will exist from an eyepoint out in all directions to the extent of the visible range. In a similar representation, and in accordance herewith, the skin 16 is reconstructed in a radial form as illustrated by the fragment 10a containing a skin 16a. An arrow 17 indicates the re-sampling operation. In the fragment 10a, the skin 16a is referenced to radial coordinates (azimuth and range) as indicated on the base 18 of the cube 12a.

In reconstructing the implied skin as illustrated, the height field is sampled attempting to maximize the visual result while minimizing the number of samples. Because the image is constructed in perspective, samples are concentrated near the eye, becoming farther apart in the distance. That is, the space between samples of elevation increases with distance from the eyepoint. Essentially, to avoid aliasing in the representation of the skin's shape, the height field must exist at several levels of detail, with each simpler level having a greater distance between the height values. In interrogating the radial height field to make an image, the spacing between elevation samples interrogated is used to select and blend between the proper levels and the location of each sample is converted into an address space for each of the selected levels.

With reference to the fragment 10a, the base 18 illustrates exemplary rays 20 (azimuth) emanating from a corner 22 (eyepoint or viewpoint). Along each of the rays, e.g. ray 20a, samples 24 (range) are taken for defining the skin 16a. As described in detail below, as the range increases, moving away from the corner 22, along the ray 20a for example, the distance between the samples 24 increases.

It is to be understood that collectively, the height samples 24 characterize the surface or skin 16a instantaneously at a sample point. Consequently, some additional processing is needed to determine what the surface is doing in between the specified samples. One possibility is to simply skin between adjacent triples of samples with a plane. The operation is somewhat equivalent to treating the height samples as vertices and skinning between them with triangular polygons.

Another approach would be to compute the surface height at interim points with a bilinear blend on the four surrounding height samples 24. Such an operation creates a curved surface interior for every four bounding samples with sharp slope changes along the straight borders between adjacent foursomes. The resulting surface appears somewhat slope-discontinuous and resembles a mix of curved patches and straight lines.

A third possibility that is generally preferred involves computing the surface behavior between the height samples by applying a filter function to the surrounding samples. With the proper choice of filter, the resulting skin or surface can be slope-continuous. The visual effect is a smoothly curving skin that is free of artificially planar regions or artificially straight edges.

The skin 16a normally will be displayed from a selected defined eyepoint or viewpoint. In that regard, systems are well-known in the art wherein a viewpoint is selected and moved to produce a dynamic image with frame sequences.

Of course, the elevation of the viewpoint or eyepoint will impact on the image just as the coordinate X-Y coordinate location defines the image. Also, the displayed image will be textured and may be shaded in accordance with techniques well-known in the art and utilizing a texture database identified with the height field, e.g. fragment 10. That is, currently, texture space is associated with a height field (FIG. 1) which is continuous and extends to the visibility range. The texture data includes an array of data that describes the color of the skin at regular positions in X and Y dimensions. In that sense, it is much like the height field and many processes that are applicable to the height field also may be used to process the texture. Referring to the cubes 12 and 12a, texture databases are symbolized by texture data 23 and 23a (fragments) represented for the height field skins 16 and 16a and aligned on the tops of the cubes.

The purpose of the texture database is to "paint" the reconstructed skin or terrain in the display. The number of elements in the texture array and the spacing between elements need not match the height field, and generally it is desirable that the texture space be of much higher resolution than the height field. Such "painting" operations are well-known and are practiced in the art.

In accordance herewith, the texturing process is completed in the XYZ space of the texture and height fields. Accordingly, the final display behavior of the texture is independent of the nature and resolution of any, intermediate sampling steps. In particular, the resolution and registration of the texture is independent of the choice of height-field filter and the resolution of the height-field interrogation. The texture can be MIP mapped using staged resolutions as explained in greater detail below, or a combination of several levels of scale and MIP clamping operators may be used to select the proper texture level of detail and control textural frequency content. Information about the local spacing and perspective texturing of adjacent interrogation samples is used to control aliasing of the texture.

Returning now to further consider the operation of re-sampling the height-field data into a radial form, reference will continue to be made to FIG. 1. Essentially, radial re-sampling constructs an eye-centered radial sample grid (fragment 10a) from a global linear X-Y sample grid (fragment 10). In the new radial space, exemplified by the fragment 10a, the address arguments comprise a ray number and the number of the sample along the ray. For example, an elevation 26 is designated by identifying the ray 20a and the third sample 24a, along the ray, counting from the corner 22 representing the viewpoint. Note that the rays 20 emanate from the viewpoint or eyepoint corner 22 in straight lines to the visibility range (not shown by the fragment 10a) and are typically distributed uniformly in heading angle THETA (azimuth) about the corner 22.

As indicated above, the spacing of the samples 24 along each of the rays 20 increases with distance from the corner 22. Typically, it has been determined to be effective for the distance between adjacent rays 20 at a location, to be substantially equal to the radial distance of the local samples 24. That is, the distance between the samples 24 along a ray 20 is to approximate the distance between the samples 24 of adjacent rays 20. Accordingly, at any particular position in the radial space, the surrounding radial samples thus form a trapezoidal patch profile 30 that is nearly square. The values associated with each radial sample 24 are derived by applying filter processes to the original X-Y data grid samples as exemplified in the fragment 10.

The radial sample space (exemplified by the fragment 10a) represents the application of range-based level-ofdetail to the original linear space (exemplified by the fragment 10), since the interrogation frequency of the original data falls off with distance. The process results in radial samples whose local spacing subtends the same angle in image space regardless of range. Note that the process step thus distributes model-space detail very homogeneously into image space. In a sense as an advantage of the radial height field format, it represents the application of "half" of the perspective transformation to the input data.

Recapitulating, the initial radial re-sampling step converts the height field (fragment 10) from its linear global form to a radial eye-centered global form (fragment 10a) as indicated by the arrow 17. The primary purpose is to divide the terrain skin 16 into a large collection of patches (profile 30) that are relatively small and uniformly sized in image space, and to provide a mechanism for trivially selecting the patches that influence a particular pixel of the final image. A secondary purpose is to be able to apply higher-order filters to the terrain skin that have greater continuity and allow continuous curvature of the skin rather than the piece-wise planar appearance that results from the traditional use of large polygons.

Figure 2:
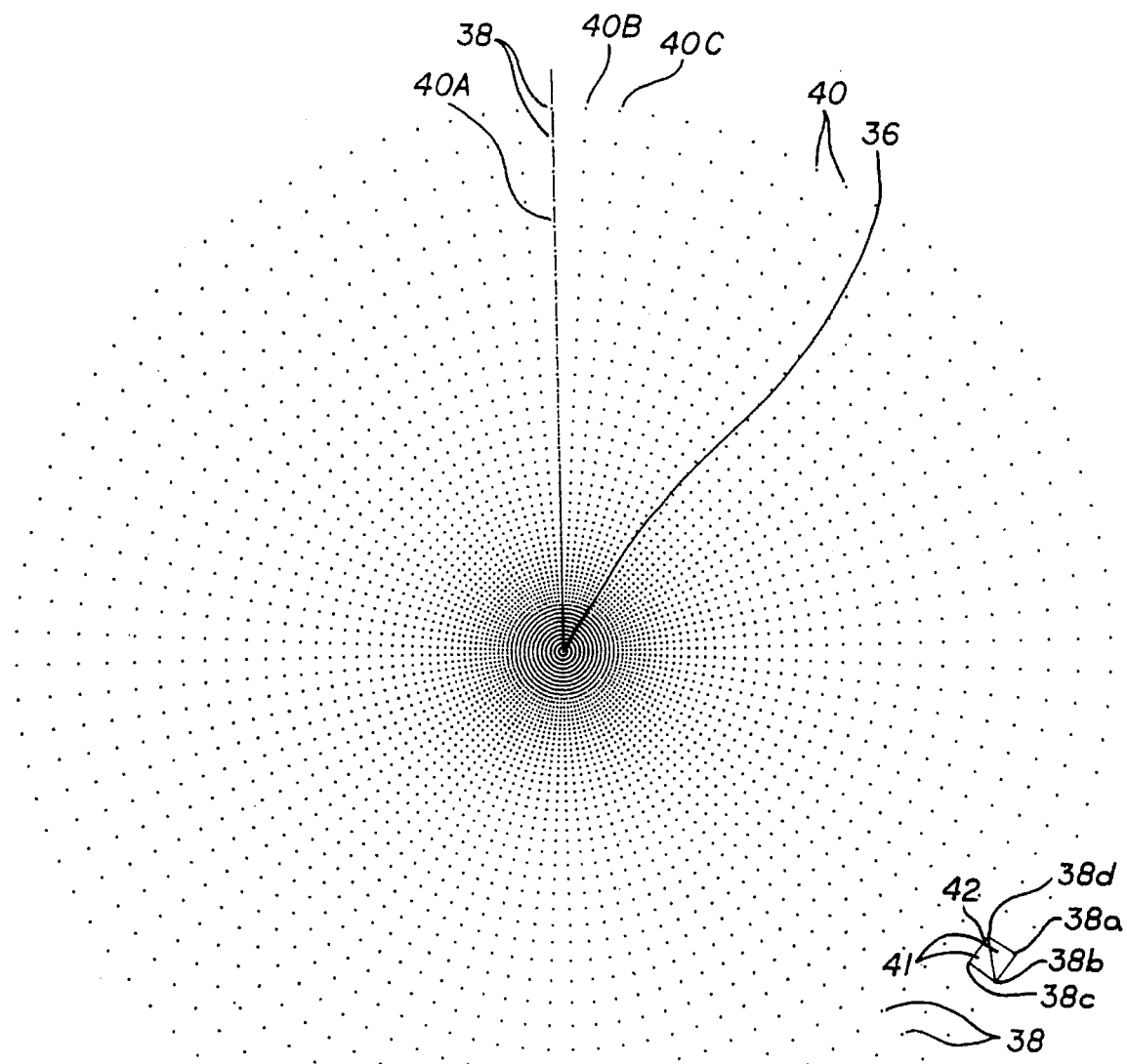
FIG. 2 is a planar graphic representation of a radial height field format constructed in accordance herewith.

In somewhat of a plan view of the base 18 (FIG. 1) however extended to a full circle, FIG. 2 illustrates the character of the radial rescan emanating from a central eyepoint 36. In FIG. 2, the samples 38 are shown along a multitude of rays 40, however, only the ray 40A is fully illustrated as a solid line.

The rays 40, defined by radially aligned samples 38, are uniformly spaced in azimuth about the eyepoint 36 and extend from the eyepoint 36 to the visibility range. The first ray 40A points along positive Y progressively, and the rays 40 then sweep clockwise like a compass rose. The rays 40 might be variously designated, for example, alphabetic designations are used to some extent below, e.g., rays 40A, 40B, 40C, etc. The format is arbitrary, but fixing the ray numbering space relative to the datum axes is necessary to allow directly relating a ray position to a global X-Y position. Thus, the ray pattern translates with, but does not rotate with the eye. The number of rays 40 also is arbitrary. A small number will result in a course stylization of the terrain skin and reduction of skin shaped detail. Also, the use of too few rays will make apparent the continuous re-stylization of the skin that occurs with eyepoint translation. The number of rays 40 selected also will depend to some extent on the nature of the filter applied to the height field in exacting height samples.

As explained above, the spacing of individual height samples 38 along each ray 40 varies to maintain about the same sample spacing along the ray as from ray to adjacent ray. Thus, as illustrated by FIG. 2, the spacing grows larger with distance from the eyepoint 36. This approach, using a radial height field, has several desirable features. First, the filtering and sampling of the height field is locally omnidirectional and homogeneous; it does not favor either the radial direction or the azimuthal direction. Second, the apparent complexity of the re-sampled skin is constant from near to far in terms of skin modulation per pixel. Thus, the number of samples required is significantly reduced, since the distant scene is represented with fewer, more widely spaced samples.

A problem does occur with the sample spacing at locations very near the eye, where the spacing of samples 38 along each ray 40 tends to decrease to zero as the rays converge at the center. The problem may be avoided by establishing a minimum spacing along the rays 40 which ensures proper interpretation of the terrain skin. The minimum spacing typically will be a small fraction of the spacing of the height field samples. Near the center of the radial pattern (FIG. 2) the height field may be oversampled significantly in the azimuthal direction, but such operation does not appear to cause harm nor is the overhead large.

Note that both the radial spacing (along rays 40) and azimuthal spacing (between rays 40) of samples can be changed to a accommodate directional level-of-detail or area-of-interest enhancement and the resolution of the re-sampling step can be adjusted to match the pixel resolution and field-of-view of the final display., For a 45×45 field of vision and a display of 512×512 pixels, seven hundred rays 40 of about seven hundred samples 38 have been determined to give satisfactory performance. The resulting number of radial samples 38 for an active field of vision is approximately sixty-four thousand.

FIG. 2 also illustrates the patches that provide the mechanism for defining pixels in a display. For example, a polygon or single patch 42 is indicated by solid lines joining four contiguous samples 38a, 38b, 38c and 38d to define a somewhat square polygon (trapezoid). Thus, patches 42 exist between each set of four samples 38.

As indicated above, each of the samples 38 is defined by a ray 40 (FIG. 2) and a spaced position along the ray 40. Each sample 38 in the reconstructed radial height field (FIG. 1, 10a) also is defined in the X and Y global coordinates and the Z height at the sample location. That is, the position data is preserved in the original global coordinate system because it is used to reference the global-texture-address space based on the global coordinate system. The defined trapezoidal polygons then may be reduced to triangular patches 41 for treatment to determine pixel content. The generation of the height field data in radial form is treated in greater detail below along with the pixel processing. However, at this point, consideration will be given to the basic steps of a process illustrative of the system, and to a structure for implementing the process.

Figure 3:
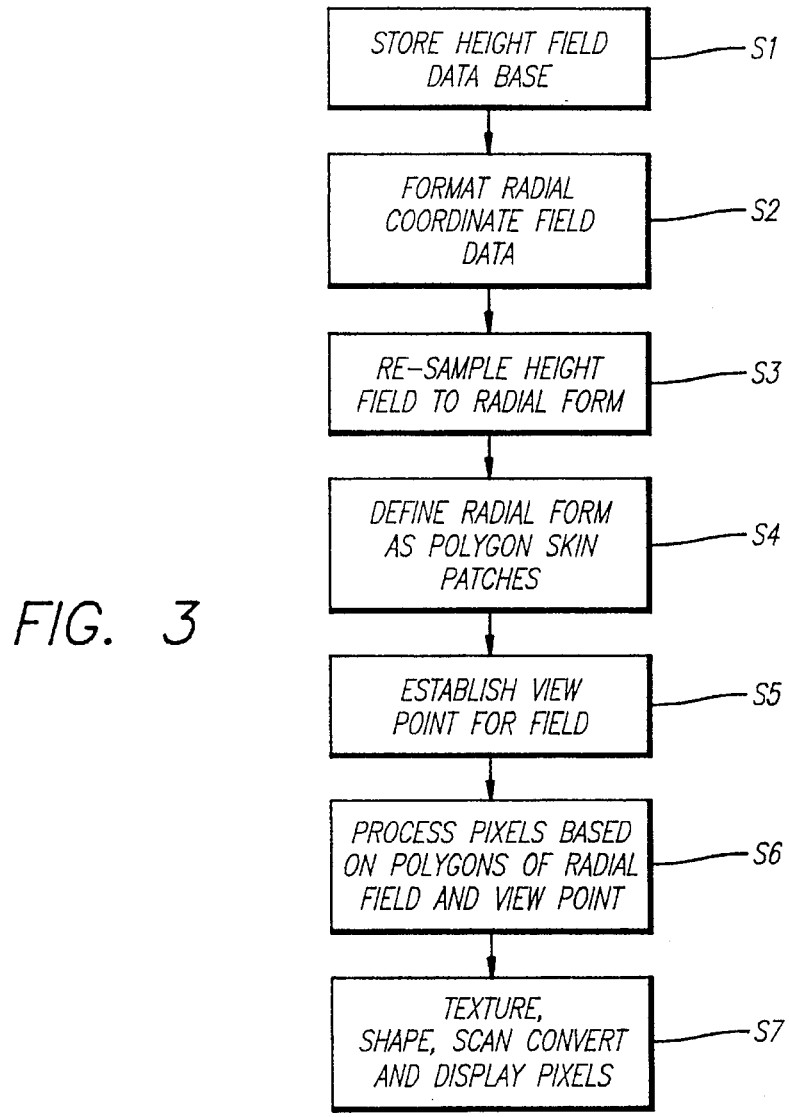
FIG. 3 is a flow diagram of the process hereof.

Referring to FIG. 3, the initial step of the process is the provision of a database height field as illustrated by the fragment 10 in a database as indicated by the process step S1.

A subsequent step involves formatting radial coordinates for the height field as illustrated in FIG. 2. The operation is represented as a process step S2 in FIG. 3.

Next, the stored height field (FIG. 1, fragment 10) is re-sampled to provide the data in the radial form using the coordinates as established. The operation is represented in FIG. 3 by the step S3 and obtains the data in the form as generally indicated by the fragment 10a (FIG. 1). Note the re-sampling operation as disclosed in greater detail below involves filtering to attain interpolated values.

With the re-sampled height field in radial coordinates, a skinning operation is performed to accomplish polygons or patches defining the height field. As disclosed below, the surface of the height field is reduced to triangles for convenient processing in relation to pixels. The operation is represented as step S4 in FIG. 3.

A step S5 involves the selection of a viewpoint for a field of vision. With the viewpoint established, rays can be extended to locate pixels preparatory to patch processing as indicated by the step S6. Specifically, as disclosed herein, individual patches, e.g., triangles (polygons) defining the skin or surface of the height field are processed with respect to pixels to determine and resolve the manifestations of the pixels.

Finally, the pixels from the process step S6 are further processed as by texturing, shading and scan converting preparatory to driving a display apparatus. As explained in detail below, the system is expedient and facilitates the development of effective terrain displays.

Figure 4:
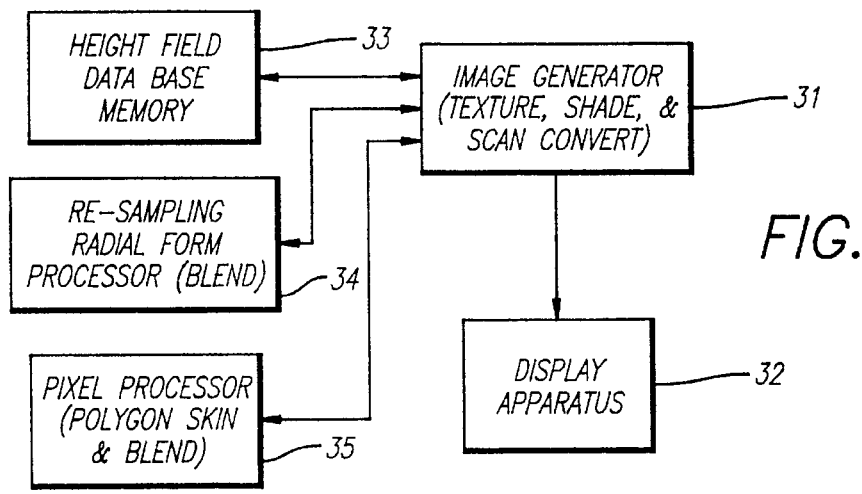
FIG. 4 is a block diagram of a system in accordance herewith.

A system for executing the process of FIG. 3 is illustrated in FIG. 4 and will now be treated. Generally, the system incorporates an image generator 31 coupled to drive a display apparatus 32. Essentially, image generators for the provision of three-dimensional dynamic scenes for use as in flight simulators are well-known and widely used. For example, such a system is disclosed in U.S. Pat. No. 4,343,037, entitled "Visual Display Systems of the Computer Generated Image Type".

Essentially, the image generator 31 utilizes a height field stored in a memory 33 to generate a perspective textured, terrain display. Such displays are well-known in the prior art as addressed in U.S. Pat. No. 4,985,854, entitled "Method for Rapid Generation of Photo-Realistic Imagery".

As illustrated in FIG. 4, the image generator 31 functions in cooperation with a pair of processors 34 and 35. Note that such structures might be intimately embodied in an image generator; however, merely for purposes of illustrating the present system, the processors 34 and 35 are shown separately.

The processor 34 re-samples the height field (rectangular coordinates) into a radial form whereby information is defined utilizing radial coordinates somewhat as represented by the steps S2, S3 and S4 of the process as explained above. The pixel processor 35, involving the process steps S5 and S6 accomplishes pixels by processing patches defined by the re-sampled radial form height field. With the completion of such pixels, final processing within the image generator 31 may include texturing, shading, and scan converting to provide display pixels for driving the display apparatus 32. Accordingly, from the conventional, rectangular-coordinate height field, effective and economical displays may be provided. Frame sequences attain a dynamic display.

The detailed operations to execute the process steps (FIG. 3) within a physical system will now be treated in further detail.

Further considering the generation Of the height field data in a radial form, reference again will be made to FIG. 1. Specifically, in the height field fragment 10, a reference elevation 50 is illustrated at a crossing coordinate position defined in terms of X and Y on the grid 14. Typically, the elevation 50 will not coincide with any of the samples 24 illustrated on the base 18 of the fragment 10a. For example, an elevation 26 in the fragment 10a at the sample 24a is offset from the sample 50. Simply stated, generally the radial samples will not fall on top of the original height values. Accordingly, a filtering process is employed to determine height values for the radial samples 24, i.e. typically at locations in between reference elevations of the rectangular-coordinate height field. Note that aspects of filtering processes for resolving interim locations in graphics displays are well-known and are treated, for example, in U.S. Pat. No. 4,893,515, issued Oct. 10, 1989, and entitled Computer Graphics Pixel Processing System.

The properties of the filter employed for re-sampling or converting the terrain height data will significantly effect the visual appearance of the displayed terrain and the grace of a dynamic display. The filter should provide a smooth transition between adjacent reference height values and should avoid the creation of slope discontinuities. Also, the filter should obey what has been termed the "Erdahl Criterion" by integrating to the same value regardless of the filter position relative to the height field. A filter wider than two input samples is required to meet the condition. The characteristics of a filter employed in a format of the current simulation is shown in FIG. 5 and now will be considered.

Figure 5:
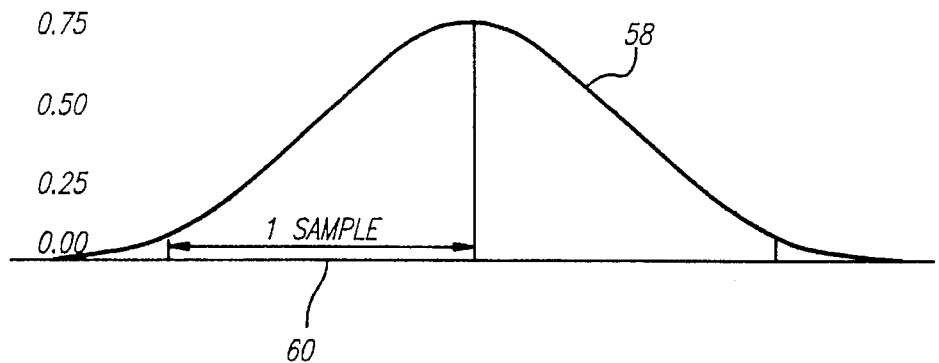
FIG. 5 is a graphic representation of a filter function as disclosed herein.

The cross-section of a filter appropriate for use in the disclosed system is shown along one axis in FIG. 5. Note that the weight (ordinate values) along the base axis (sample space) is determined by computing the distance along that axis from the existing height value to the position of the radial sample, and using that distance to fetch a weight value from a memory (RAM) containing the filter profile. Such techniques are well understood and widely used in the art. For each radial sample 24, the offset distances in the X and Y directions (grid 14) are used to find the corresponding weights which are multiplied to get a final weight of the height as a contribution towards the sample value. For the filter as characterized in FIG. 3, up to nine height-field values may be used to compute an output height. Each of the nine heights (e.g., elevation 50) will be weighted by its position relative to the radial sample 24, and the resultant sum is the output value for the patch (e.g., elevation 50). In this context, the meaning of the Erdahl Criterion becomes more intuitive. In short, the Criterion simply means that for any position of the sample relative to the values in the height field, the filter weights (possibly nine) will add to exactly one.

Recognizing that a variety of filters could be used to accomplish the process step as explained above, some further comment may be useful in relation to the filter as represented in FIG. 5. It is a derivative of a third-order filter in a sequence. The sequence begins with an impulse (zero order))convolves it with itself to generate a one-sample wide box (first order))convolves the box within itself to generate a two-sample wide triangle (second order) and then convolves the triangle within itself to generate a three-sample wide bell-shaped curve.

In the sequence, each new filter is derived from the previous by shifting the input envelope one sample, inverting it, and integrating the composite envelope of the original and shifted filters. The filter as represented in FIG. 5 is equivalent to applying the three-element wide filter to an expanded resolution height field where new samples between the original heights are created by bi-linear blend. The filter is numerically equivalent to applying the third order filter as described above (Newell filter) to the expanded height field. It provides somewhat sharper interpretation of the skin shape while still smoothing adequately between actual height samples.

Recapitulating to some extent, translating the height field as represented by the fragment 12 (FIG. 1) to a radial form as represented by the fragment 12a involves the determination of offset coordinate points. For example, the height or elevation 50 (fragment 10) is offset somewhat from the height elevation 26 (fragment 12a) taken at the radial coordinate sample 24a. To accomplish the conversion, as indicated above, a plurality of height values at different coordinate points of the rectangular height field (fragment 12) are filtered and combined to establish the height elevation 26 at the radial coordinate point 24a. Essentially, a bell-shaped curve 58 (FIG. 3) is applied, based on the sample spacing as indicated on the horizontal coordinate 60. Thus, the distance from a contributing sample to the desired coordinate location fixes a location on the curve 58 to define the weight attributed to the reference sample.

It is to be noted that in re-sampling the height field represented by the fragment 12 (FIG. 1) into a radial form as represented by the fragment 12a, the location of samples, e.g., samples 24a, are provided in coordinate values of the original height field as well as the radial coordinates. The development and processing of sample coordinates is treated in further detail below.

As a general consideration, to avoid aliasing in the re-sampling of the height-field data, the radial samples should be more closely spaced than the samples in the height field. Specifically, the samples 24 (fragment 12a) should be more closely spaced than the coordinate locations or samples of the grid 14.

Since the radial sample spacing (base 18) increases with the distance from the eye, this requirement can only be met by switching to progressively coarser representations of the height data where the distance between height samples is progressively greater. This provides a natural fall-off of skin detail in model space, but due to perspective foreshortening, the terrain skin detail in image space remains nearly constant independent of range.

Figures 6A, 6B, 6C:
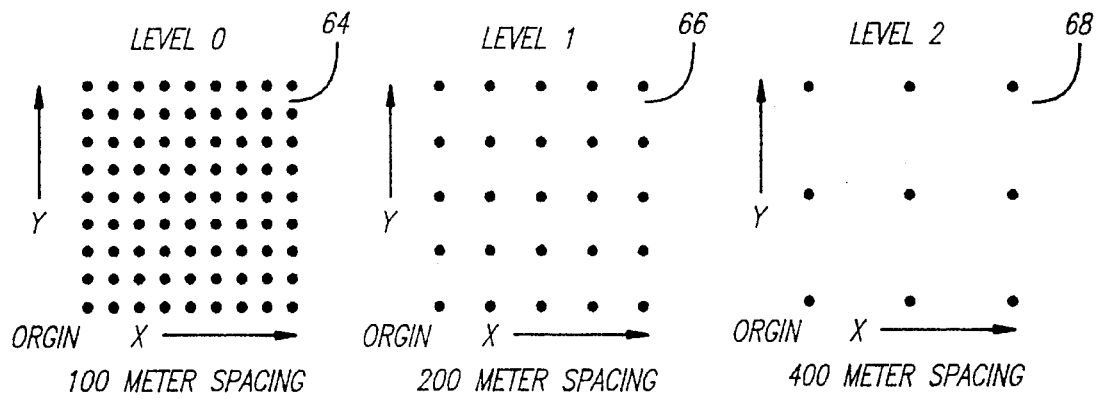
FIG. 6A–6C are graphic representations of data sample patterns as utilized herein.

FIGS. 6A through 6C illustrate the level-of-detail structure for the height field, showing three different spacing relationships. As mentioned above, the operation may be implemented as a straightforward MIP strategy. The initials "MIP" stand for "multum in parvo" Latin for "many things in a small space". Essentially, reference is to the fact that each simpler, coarser representation of the data is the result of filtering the previous matrix of data to eliminate changes that cannot be represented at the coarser resolution. The filtering process averages or smoothes the high-frequency detail to derive a more slowly varying representation that can be adequately represented with fewer samples. A detailed treatment of MIP strategy and its implementation is disclosed in a publication entitled *Computer Graphics,* Volume 17, Number 3, July 1983, specifically in an article by Lance Williams entitled "Pyramidal Parametrics".

In the currently described implementation, each lower level of detail contains one-fourth as many samples with lateral spacing of the samples being doubled in each direction. The progression is illustrated in FIGS. 6A, 6B and 6C, showing respectively a one hundred meter spacing, a two hundred meter spacing and a four hundred meter spacing. Essentially, as shown, the number of samples decreases at each level of increased sample spacing. Enough samples are carried at each level to get out to the visibility range from the eye, e.g., one hundred miles. At a one hundred meter spacing, the level of detail is considerably more apparent than at a two hundred meter spacing or a four hundred meter spacing. Thus, the number of samples decreases as the spacing between samples increases.

To be more specific, to avoid aliasing, which in this situation means an erroneous unstable interpretation of the terrain shape, there should be at least two radial samples between every rectangular height value. The condition is known as the "Nyquist Criterion". Essentially, switching is made to different MIP levels as illustrated in FIGS. 6A, 6B and 6C, as the radial sample spacing increases. The switching also should be gradual and smooth. Accordingly, transition to a coarser level should begin somewhat in advance of reaching the defined Nyquist limit. Visually, the smoothest transition strategy is the one that distributes the transition over the largest range or the longest time. Accordingly, a process operation is set up where transitioning is usually in progress between two appropriate MIP levels. For example, switching to a new level may begin when there are four radial samples per height sample and be complete when there are only two.

To accomplish such a switching operation, a spatially filtered height value is computed for each of the two bounding MIP levels and sample spacing relative to the height field is used to weigh the two filtered values into a final height. Accordingly, interpolation is accomplished utilizing the known technique of MIP mapping. If four radial samples are involved per height-field sample, the higher resolution MIP level gets all the weight; when there are three, the higher resolution MIP level and the next lower MIP level get equal weights; when there are only two, the lower gets all the weight and preparation is made to switch to the next coarser pair of bounding MIP levels. Thus, smooth transitions are accomplished.

Re-sampling the height field into a radial format results in a new height field where the samples are addressed by azimuth (angle) and range (distance) relative to the eyepoint somewhat as illustrated by the fragment 12a (FIG. 1) with the eyepoint at the corner 22. As generally indicated above, data for each radial sample 24 includes the X-Y position (in the original linear space) and the new filtered Z-height.

Because the radial sample space is eye-relative, rays 20 can easily be identified that affect pixels of the image as the pixels are computed. Accordingly., essentially half of the "association" or "look-up" problem is solved. Still, a need remains to create some additional data that will allow specifying the smallest number of radial skin samples affecting any particular pixel of the final image. That is, in the generation of specific pixels of the final image, the smallest number of radial skin samples are identified for contributions to the pixel, again utilizing filtering techniques to avoid aliasing.

Figure 7:
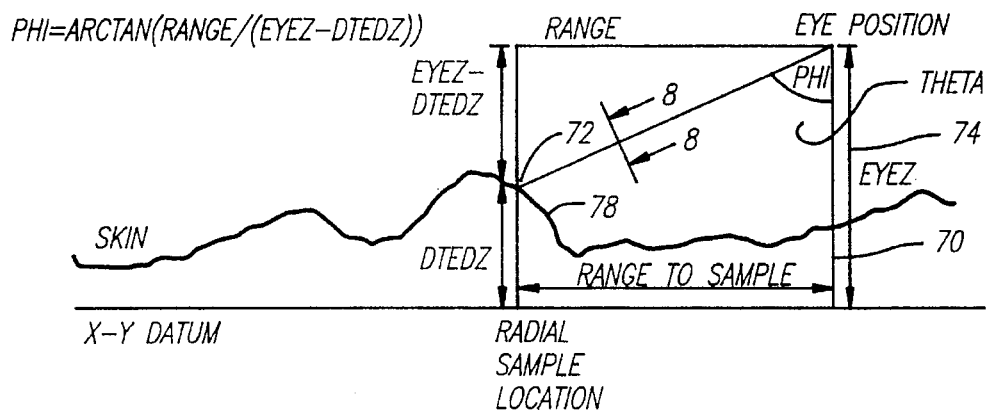
FIG. 7 is a vertical sectional view of terrain with applied graphic illustration.

The next step in the process, as now will be considered is to compute an elevation value in eye space for each radial sample based on the eye position and the sample position in XYZ space. FIG. 7 illustrates the geometric relationships involved.

The elevation parameter is most directly thought of as the angle PHI from the negative vertical 70 to the sample 72 and is computed as an arc-tangent. Other, simple metrics of the elevation also could be used, but the elevation number space should be reasonably homogeneous in image space, since subsequent anti-aliasing processes will involve the elevation number space.

The elevation parameter becomes a second portion of the "address" of the sample. Thus, by using the heading angle of the ray THETA (FIG. 7, arrow) and the elevation angle PHI of the particular sample, the location of the sample is identified in pixel space. Such information for each sample is sufficient to create pixels for a textured image. However, a number of additional refinements can be applied to improve the efficiency of the rendering step, some of which are described at a later point herein. At this point, the description will proceed to the second major process step, specifically, the generation of the image pixel-by-pixel.

Recapitulating to some extent, having re-sampled the height-field data (FIG. 1, fragment 12) into a radial form (fragment 12a) with samples identified in both the coordinates of the rectangular height field and the radial form, the process next involves defining polygons or patches. To create pixel data, each pixel vector is transformed into radial space. The radial skin height samples affecting the pixel then are identified and the texture results for each local sample are computed at the pixel. Filtering the results together based on image-space relationships between the pixel and the local samples then provides pixel data. As the description proceeds, several unlikely shortcuts will be revealed, not only to save immense computational time, but to result in a very solid, high resolution image in accordance herewith.

The process originates with height-field samples comparatively widely spaced, at least for portions of the image. The radial conversion or re-scan step essentially creates a new height-field or form with sample spacing nearly homogeneous in image space, but still a number of pixels wide. Next, the process involves a step to provide surface samples for every pixel in a final re-sampling and filling operation. The step treats the radial samples as vertices of flat triangular polygons (patches) and provides a piece-wise planar final surface based on the radial height samples. A patch-by-patch treatment of the radial re-scan surface or skin 16a (FIG. 1) provides stable texture and the sharp edges associated with ridge lines. The processing of the triangular polygons in this context as described below, differs significantly from past practice.

FIG. 8 shows an image space view of a portion of the radial sample space surrounding the center of a display pixel 76. In a sense, FIG. 8 may be considered a sectional view of FIG. 7 taken along the line 8—8 The coordinates of the samples 79 are the ray numbers (azimuthal angle) and the elevation of the samples. The pixel vector has been mapped into the same coordinate space by having its XYZ coordinates transformed into the coordinates of THETA and PHI as well. In this coordinate space, the radial samples always form vertical columns with only the spacing from sample to sample within the column varying. The pixel vector always falls within a single column and the fractional THETA value can be used to determine its lateral location.

The "view" of the situation in FIG. 8 is depicted in THETA/PHI space and will be treated such that the pixel 76 is a single isolated situation to be individually determined or resolved. In fact, no concern need be given the orientation of the pixel rather, it is only important to work on the basis of the radius of the filter function associated with the pixel expressed in terms of THETA/PHI space. Actually, a simplifying assumption will be set forth subsequently that only requires consideration of PHI in the filtering step. However, at this point, it appears useful to treat the units of PHI space in terms of pixel filter half-width.

Figure 10:
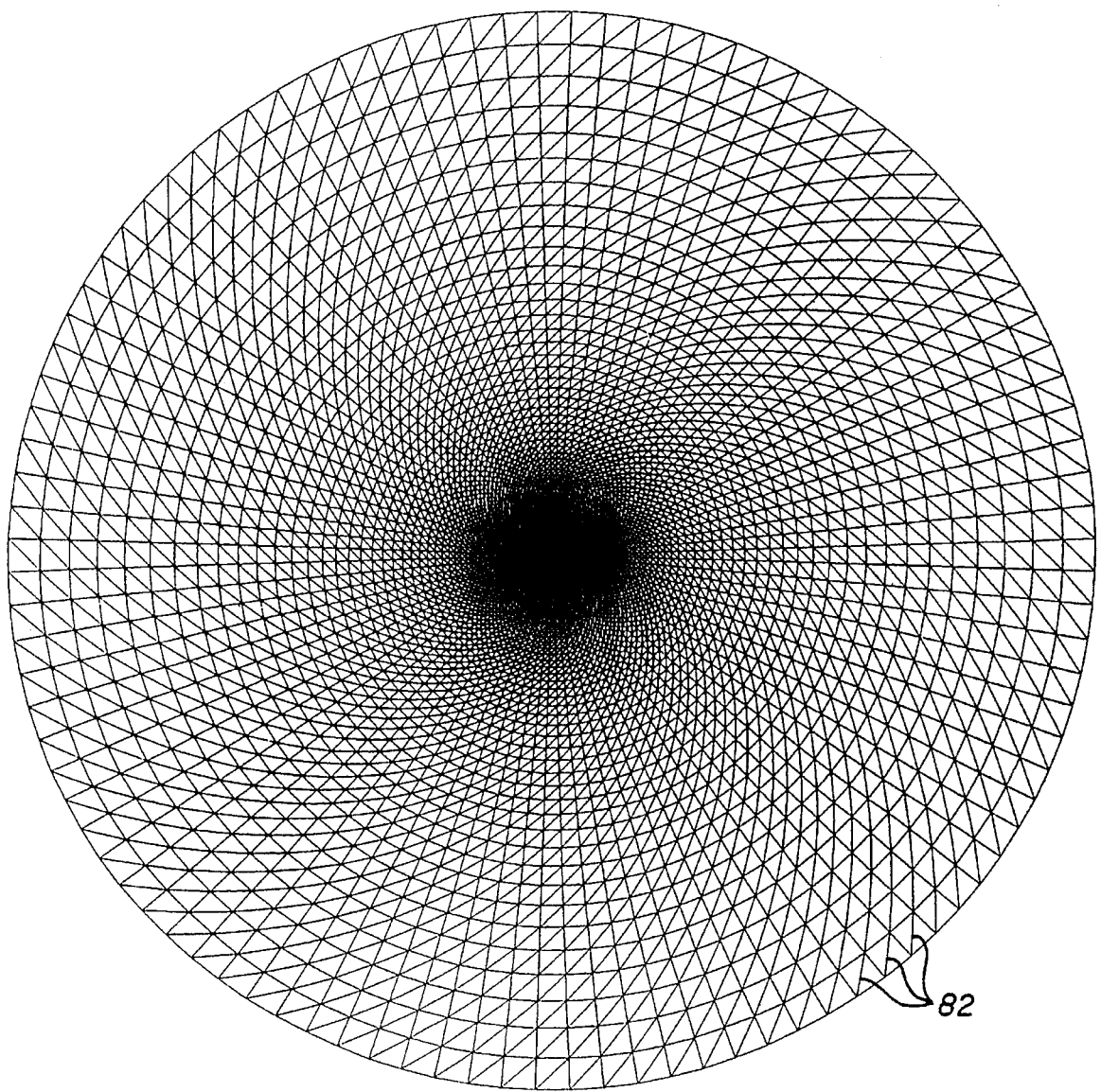
FIG. 10 is a graphic representation of a radial height field in accordance herewith showing defined polygons.

To understand the behavior of the surface 78 (FIG. 7) and particularly of ridge lines, a skinning must be inferred as by connecting the local samples 79 illustrated in FIG. 8. Accordingly, FIG. 9 shows the samples 79 of FIG. 8 connected with a simple skinning algorithm to define samples or triangles 82. The triangles 82 are connected along the rays, between the rays in concentric circles and across each trapezoid along the lower left to upper right corners. Thus, with the connector lines 80 (FIG. 9) the pixel 76 is illustrated within a group of the triangles 82. The entire radially re-scanned skin, as it appears in the height-field configuration is depicted in FIG. 10 in plan view. Note that the choice of connectivity is somewhat arbitrary and only serves to establish a representation of the surface. The samples or triangles 82 provide the basis for pixel processing. At the relative resolutions of the radial space and pixel space, the stylization is quite stable irrespective of the skinning algorithm employed.

Generally, some preliminary observations are relevant in relation to the patch filtering regarding the patches or triangles 82 as depicted in FIG. 9. Specifically, the triangular patches are interrogated to determine their contributions to nearby pixels and in that regard filtering processes are employed to account for the line perspective substance and relative position of patches to pixels. Stated another way, as well-known in general, individual pixels are resolved by considering the contiguous patches. The filtering process has two objectives: to account for the frequency content of texture due to the perspective foreshortening of the surface patches or triangles 82, and to account for the sharp edges introduced into the scene due to local ridges that result where patches are omitted due to either being backfaced or occulted.

Viewed from a selected eyepoint 84 (FIG. 11) a patch edge 86 is illustrated extending between points Z1 and Z2. The model-space width DR of the patch is adjusted downward for the effect of lateral slope and the model-space length DR is adjusted upward for the radial slope. If the slopes are not extremely steep, say less than seventy-five degrees, it suffices to ignore the effect of slope and treat the model-space subtents as simply a distance DR.

The image-space subtents of the patch is constant in the azimuthal direction, which is always the larger image-space dimension (given the simplifying assumption above). Thus, the critical dimension relative to clamping texture, is the image-space subtents in the PHI direction. The clamping process uses the model-space length of the projected-pixel footprint, and this is directly determined by scaling the ratio of the DR to DPHI (FIG. 11) by the factor that relates the texture map length to model space. Hard edges appear in the image wherever the skin texture motif becomes discontinuous due to patches that are backfaced or occulted. Consequently, in order to create sharp, well-behaved ridge lines, the patches must be processed with a filter that treats them as if they were actual polygons. Such a filter is applied to every patch without knowing whether any edges of the patch are ridge edges.

Now consider the image-space representation of the mesh of continuous patches as illustrated in FIG. 12 with alphanumeric designations. Every pair of azimuthally adjacent patches shares a common edge that establishes the front-faced/back-faced status and the texture clamping factor for both sides. For instance, patches A3 and B4 will both be either front-faced or back-faced depending on whether the PHI elevation of a sample S2 is above or below the PHI elevation of sample S1. Both also will get the clamp factor associated with the common edge connecting the samples S1 and S2. The image of the height-field skin exhibits this property everywhere; that is, there are no changes in the texture clamping values between adjacent radial columns of patches in either model-space or image-space. For the same reasons, there are no changes in occultation, in hiding along the rays. Edge S1-S2 can never be a ridge because the patches on both sides will have the same FF/BF status. Topologically speaking, all of the patch edges along the rays can be ignored and only those patch edges in the azimuthal and diagonal directions must be considered. The above considerations suggest the possibility of filtering patches into pixels with a unidirectional filter function. Such a filter function operates only in the PHI direction. Since it is unidirectional, and since it already has been recognized that skin slopes will generally not be extremely steep, it is also possible to ignore the effects of edge slope and merely filter values based on distances from the pixel to the edge of the PHI direction. Such an operation is a considerable simplification and is illustrated in FIG. 13. Accordingly, a patch 90 is shown for processing with vertices 92, 94 and 96. Note that the vertex 92 is at sample K, the vertex 94 is at sample K and the vertex 96 is at sample K+1.

The patch 90 is shown as the lower right triangle connecting the ray N to the ray N+1 at the KTH sample. In this and subsequent figures, the lateral direction is THETA as indicated by an arrow 98 and vertical direction is PHI as indicated by an arrow 99.

The pixel centroid or center 91 lies somewhere between the rays N and N+1; its fractional position being used to compute the location of the upper and lower patch edges at the pixel location. Such a situation is indicated in FIG. 14. Note that the pixel center 91 need not lie interior of the patch 90 for the patch to have an effect on it, since the pixel filter extends above and below the pixel center. The fractional pixel position in THETA is used to compute a model space XY and PHI for the upper and lower edges at the pixel THETA location. This effectively converts the problem to a one-dimensional clip and filter situation with considerable simplification.

FIG. 15 shows the texture look-up and filter problem in the one-dimensional domain. The patch 90 extends from the lower to upper PHI's as illustrated at 100, 102 and 104. That is, these are simply values of PHI. Since the filter function also is expressed in terms of PHI, this information is sufficient to compute the weighting for the patch 90 (FIG. 13) towards the pixel 91.

The pixel PHI value (FIG. 15) also is used to interpolate the upper and lower values of X and Y to the pixel X and Y values for the texture look-up. The texture clamp factor associated with the patch is used to control texture aliasing.

Next, consider the manner in which the size of the pixel filter function affects the process as illustrated in FIGS. 16A–16D. Specifically, in FIG. 16A, the pixel 91 is interior to the patch 90 but the top edges of the filter (represented as a vertical stripe) extend above the top edge of the patch 90 represented by upper and lower dots.

In FIG. 16B, the filter is entirely interior to the patch 90 and in FIG. 16C, the filter extends both above and below the edges of the patch 90. In FIG. 16D, the pixel 91 is above the patch 90 but the filter extends to the patch 90. All of these special cases are handled by a single simple format that determines the proper space to compute the texture X and Y values. For example, assume a desire to compute a model space XY value for the middle of the portion of a patch which lies interior to the filter. Specifically, an upper station will be computed which is the lesser of the upper filter boundary and the upper patch value and a lower station which is the greater of the lower filter boundary and the lower patch value. All these positions are expressed in terms of PHI. Thereafter, the upper and lower stations will be averaged to obtain the PHI of the texture interrogation point, compute the model-space X an Y values then apply the texture.

FIGS. 17A–17D illustrate by a horizontal bar, the location where the texture sample is taken for the cases of FIG. 16. Since the upper and lower station points are within the filter envelope, they also can be used to determine the filter weighting for the active portion of the patch.

Recapitulating to some extent, the complete solution for a pixel involves: (1) finding all the patches which impinge on the associated pixel filter, and (2) processing them in a front-to-back order until the pixel is covered. If the patches are exhausted (the process runs out of patches) before the pixel is totally occulted, then the pixel contains a horizontal silhouette, and final result is the properly filtered horizontal edge.

The process also may run out of pixels before it has processed all of the relevant patches, since the remaining patches are hidden by nearer portions of the skin. The filter format as described handles such situations nicely.

Next, assume a list of patches, in front-to-back order (i.e., in ascending number between the relevant pairs of rays) which impinge on an assumed pixel. Because the process proceeds in visual priority order, a running "ridge" value can be established by storing the highest top edge of all previously processed patches. The top edge of each new patch either will lie below such a ridge (totally occulted for the assumed pixel) or somewhat above it, in which case the visual part is the part between the ridge and new top edge. Note that because the skin is continuous, a situation will never occur in which the bottom edge of a new patch lies above the previous ridge value. That is, the ridge value can be treated as the bottom of the filter envelope for each subsequent patch processed for the pixel. The ridge is initialized to the filter bottom to begin pixel processing and when the ridge value finally rises to the top of the filter envelope, the operation is complete. Any further patches can be ignored. Note that such a process has the effect of compelling the texture of each patch to be sampled in the middle of the visible portion of the patch.

While the process as described provides an elegant way to solve a particular pixel for a display, it may be convenient to avoid considering every patch in a ray column for each and every pixel. Further advantage can be taken of the properties of the radial space to build some auxiliary data tables that greatly reduce the number of patches in need of processing for each pixel. Accordingly, the number of processed patches can be reduced. Since each column of patches is processed from front to back, it would be desirable to find the closest patch within the column that affects each pixel. It also would be desirable to be able to skip over patches that are back-faced or totally occulted. Both of these objects can be accomplished by building a list in memory that contains only the front-faced, not-totally-occulted patches within each column and another list that points into the first list and is addressed by THETA and PHI.

The first list is constructed by processing all the patches within a column in front-to-back order. A patch is back-faced if the PHI address of the far sample of its radial edge is less than the PHI address of the near sample. Note that every patch has only one edge in the radial direction: the right edge for lower right patches, and the left edges for upper left patches. Back-faced patches are eliminated from further consideration, and front-faced patches are tested to see if they have been totally occulted by a prior patch. Occultation is determined by keeping a "ridge" value for the column that is adjusted upward as higher top edges are encountered. If the high side of a top edge is below the ridge, it is eliminated as already occulted. The new ridge is the larger of the old ridge and the lesser of the two top edge PHI values.

FIG. 18 illustrates in simple form, the manner in which the list would be constructed from a given skin profile. A plurality of planar patches $P_1$ through $P_{15}$ are illustrated, extending contiguously with respect to an eyepoint 120. The patches $P_1$ through $P_6$ all are front-faced, and none are occulted so that they are entered in the list. The patches $P_7$ and $P_8$ are eliminated because, as illustrated, they both are back-faced. The patch $P_9$ also is eliminated because it is totally occulted. Similarly, the patches $P_{10}$, $P_{11}$ and $P_{12}$ are entered in the list, the patches $P_{13}$ and $P_{14}$ are skipped and the patch $P_{15}$ is entered. Accordingly, the final list as stored consists of patches $P_1$, $P_2$, $P_3$, $P_4$, $P_5$, $P_6$, $P_{10}$, $P_{11}$, $P_{12}$ and $P_{15}$.

FIGS. 19A–19D illustrate the manner in which the occultation process operates on the complicated situations that arise when back-faced and occulted patches are eliminated. In FIGS. 19A–19D, as oriented, the view is indicated by an arrow 102, the composite being shown in FIG. 19D. The first patch (FIG. 19A) establishes the ridge at the low side of the top edge. When the next patch, as illustrated in FIG. 19B, is considered, part of it extends above the ridge so it is entered into the list, and the ridge is adjusted upward to the low side of the patch. The patch in FIG. 19C also is entered in the list since parts of it extend above the current ridge (patches of FIGS. 19A and 19B) and the ridge is again updated.

The composite situation, as illustrated in FIG. 19D, shows the portions of all three patches that are visible, the final image accordingly portraying such a property. It is interesting to see how this happens as now will be considered with reference to FIG. 20 showing the composite 118 including the three patches 112, 114 and 116.

Assume additionally with reference to FIG. 20 that the small boxes A, B and C, designated respectively 122, 124 and 126 represent the extent of a pixel filter for pixel centers located centrally within the boxes. All three pixel filter boxes 122, 124 and 126 are to be processed beginning with the first patch.

When the first pixel is processed, it will be determined that the patch 112 covers all of the filter box 122. Accordingly, the proper texture associated with the patch 112 is determined and the step is complete. With regard to the pixel box 124, it is determined that the first patch 112 covers substantially forty percent of the filter box so accordingly forty percent of the texture associated with the patch 112 is used. Since the top edge of the patch 124 is above the filter, the remaining sixty percent of the box 124 receives the texture associated with the patch 114.

With respect to the pixel box 126, it is determined that both of the patches 112 and 114 lie entirely below the box 126. Accordingly, they contribute nothing. However, the patch 116 covers twenty percent of the filter box 126 so that the texture associated with the patch 116 is used. As there are no other patches to process, the pixel box C is left at less than full coverage as part of the creation of an anti-aliased horizon silhouette.

From the above, it may be seen that a considerable amount of irrelevant patch data is eliminated in accordance with the process; however, a need may continue to exist for a fast subprocess to locate the starting point in the list, given the THETA and PHI of the pixel vector. The list is built by processing the culled-patch list in front-to-back order. For each patch in the list, the highest affected PHI is computed by taking the maximum PHI associated with the patch vertex and adding the pixel filter half-width to it. Each list element in the PHI list at or below such a PHI is filled with the number of the patch, provided a prior patch has not already occupied the list element.

At the completion of the process step, the PHI list contains at every element, the nearest patch that must be processed to properly solve the local image. Complete solution of the image at any pixel is accomplished by starting at the patch designated in the PHI list at this THETA and PHI, and processing sequential patches until the pixel is fully occulted or the patches are exhausted. Note that in the building of each PHI list, a deterministic amount of processing must be performed. Each patch that is front-facing and not fully occulted must be inspected once and each entry in the PHI list must be filled once.

Another consideration involves minimizing the depth complexity. The number of patches that must be processed for any one pixel depends on the relative size of pixels and patches, as well as the particular topography of the skin being rendered. This number can be greatly influenced by providing a better resolution patch between the PHI list and the pixel space as illustrated in FIG. 21A–21B and now will be considered.

Figure 21B:
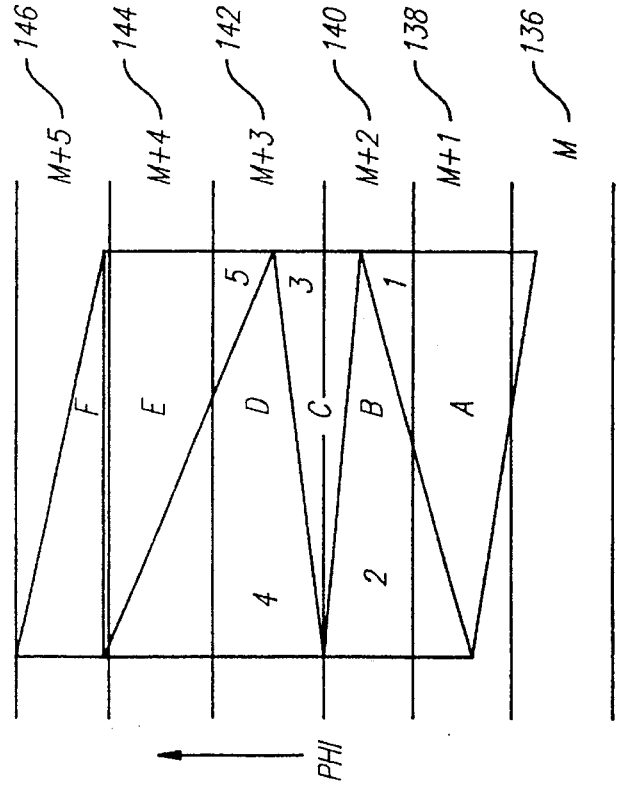
FIG. 21A–21B are graphic views illustrating pixel processing in accordance herewith.
Figure 21A:
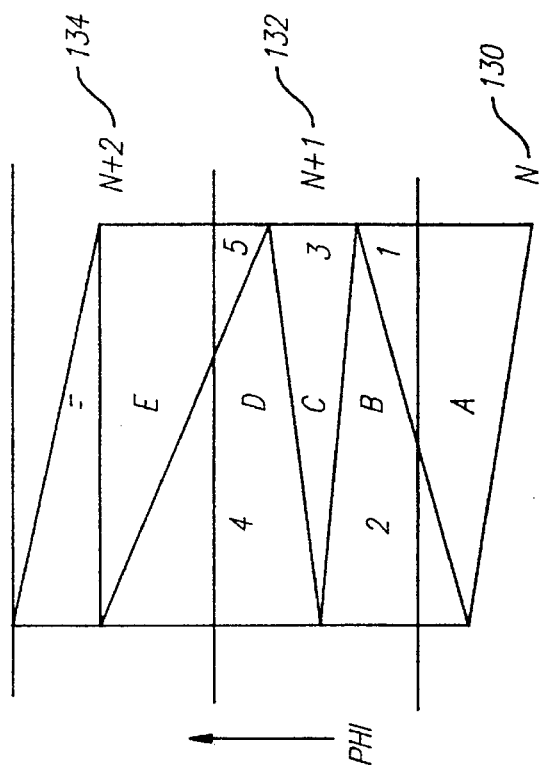

The representations in FIG. 21A and 21B are generally similar in that the pixel sizes are the same as are the patch sizes; however, in FIG. 21B, the size of the PHI list in the PHI direction is doubled. In that regard, each of the FIGS. 21A and 21B show a series of PHI intervals. Specifically, in FIG. 21a, PHI intervals N, N+1, and N+2 are respectively designated as PHI intervals 130, 132 and 134. In FIG. 21b, intervals M, M+1, M+2, M+3, M+4 and M+5 are respectively designated PHI intervals 136, 138, 140, 142, 144 and 146. In FIG. 21A, any pixels in the N+1 PHI interval 132 will be begin within patch A. The number of patches that must be processed (disregarding filter effects for the present) is a function of how soon the patches cover the pixel. For position 1, only patch A is required while A through E must be processed at pixel location 5. The total number of patches processed for the five pixels is 1+2+3+4+5=15, for an average depth complexity of 3.

Considering the representation of FIG. 21B, for pixels in the N+2 interval 140 (pixel positions 1 and 2) begin with the patch A and for pixel positions 3, 4 and 5 in the N+3 interval 142 begin with the patch C. The total number of patches processed for the five pixels is thus 1+2+1+2+3=9, for an average depth complexity of 1.8. In general, the increase in PHI list size does not buy the same deduction in depth complexity, but the relative ease of computing the PHI list compared to solving pixels may make this an attractive strategy for consideration. Note that consideration also should be given to doubling the number of PHI lists in the THETA direction for similar help. These variations in the relative resolution of the PHI lists are independent of the basic radial re-sampling step and do not affect the final pixel solving step. The PHI lists merely serve to reduce the number of patches that must be considered relative to any one pixel. Next, consider the culling operation in model space as related to the field-of-view. In most cases, the field-of-view of the desired image is a small portion of the entire image sphere. A relatively simple initializing process can be used to compute which portions of which rays must be sampled to support the actual FOV (field-of-view). For this situation, points are projected along the periphery of the FOV cone onto the height-field datum and it is noted how far out the perimeter cuts each ray. The FOV cone is scaled slightly oversized to ensure complete coverage and a few special cases must be addressed to solve situations where the P-vector to the perimeter aims above the datum horizon and where the coarseness of the perimeter sampling skips a THETA column. Note that each ray must be sampled from the center (eyepoint) out to the field of vision (FOV) parameter intercept, since it is unknown whether surface height will move portions of the surface into the bottom of the FOV even though the associated portion of the datum lies below the FOV.

Figure 22:
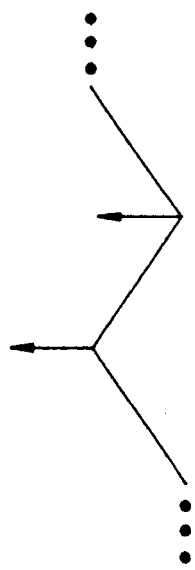
FIG. 22 is a graphic view illustrating a shading operation in accordance herewith.

Consider now the step of shading the reconstructed skin. While distortions of the texture motif due to skin shape provide adequate visual cues about the surface shape, strong additional cues are provided by incorporating the effects of directional illumination. To accomplish such effects, two shading algorithms have been used. In one instance, sample level reflectances at the height-field resolution are computed and bi-linearly interpolated to get new reflectances at each radial sample. The initial reflectances are derived by considering local surface shape around the sample, generating a surface normal vector, dotting with the sum directional vector and massaging the output value to apply ambient and back surface effects. That is, the dotting involves dot products. The resulting shading is visually equivalent to having smooth-shaded a continuous triangular skin connecting the original height-field values. In pursuing such a process step, it should be realized that the shading samples generated tend to undersample the surface shape by a factor of two. FIG. 22 illustrates the problem. The skin connecting four height samples is shown in cross section. The surface normals for the two interior samples both point straight up since that is the average surface direction at those points. Surface slope information is lost for the middle skin patch and it is shaded as if it were horizontal. The problem occurs across surfaces when the shading information is generated only at height samples (vertices) and causes the final image to have rather bland shading and be missing much of the nuances of shape definition. Accordingly, another algorithm may be used, changing the algorithm to generate surface normals at the radial samples, which generally represent an oversampling of the original height field. The step provides surface normals at points between the original height samples, resulting in a shading model which follows all of the nuances of the original surface. The shading normal at each sample is computed by treating the adjacent samples in THETA and PHI as the vertices of a quadrilateral, summing the cross products of the edges and normalizing the result.

Somewhat as another aside, consider the convolution aspects. The rendering process described can be used to generate a new texture map in a spherical address space that contains the properly convolved model-space texture motif. To take advantage of such phenomena, one would need to use a radial re-scan space with the same angular resolution as the final display pixels. The convolution algorithm uses the same radial re-sampling step but is simpler second pass. The generation of the lists can be skipped, the processing each ray as a one-dimensional string of samples where the location of the samples in PHI is used as the filler argument to determine how much of which samples goes into which spherical textels. In processing sequential samples along the way, if the new PHI is less than the previous maximum PHI, the sample is simply discarded as either back-faced or occulted. In this process, the height-field Z data is only used to compute the PHI data for each sample and a texture value is generated for each sample in the radial re-sampling step. The X and Y model space data is only used for the texture look-up and is not saved for the second pass. The output of the radial re-scan is just columns of samples where each sample has a PHI address and reflectance (or color) and the output of the second pass is just reflectances (or colors) addressed by the THETA and PHI arguments. The texture map can be applied to any kind of an image substrate since the address arguments are inherent in the pixel vectors used to generate the display image. This would allow the use of facades for distant mountains, for example.

In the initial test, the process steps described above were simulated on VAX Fortran and run on the Engineering Cluster. The Fortran code is about seven hundred lines, and the bulk of the computations occur in two one-page loops. A number of still frames were computed as well as several long dynamic sequences that were accumulated on a laser disc recorder. Several variations were simulated that were aimed at reducing the quantity and complexity of the situations. The simplifying assumptions used in the filtering process worked particularly well and even with radial exaggerations of 10 X (which gave many slopes nearly eighty degrees) the ridge edges were sharp and well behaved.

The process creates sharp, well-defined texture and ridge edges regardless of the terrain orientation in the view port. At modest radial re-sampling resolutions, discernable motion artifacts can be minimal. Accordingly, a distinctly advantageous system is disclosed. In that regard, numerous variations re possible as will be apparent to one skilled in the art, specifically to some of the more detailed aspects of the description. Accordingly, it is deemed appropriate that the scope hereof be determined in accordance with the claims.

What is claimed is:

1. A process for producing a perspective image based on height field data, said image having a foreground and a background, said process comprising the steps of:

establishing a centered viewpoint for said perspective image;

sampling said height field data to generate a radial form height field, said height field having a relatively greater level of detail for said foreground and a relatively lesser level of detail for said background, said sampling step including:

defining rays extending radially from said centered viewpoint in model space, said rays being substantially parallel in image space; and sampling said height field data at selected locations along said rays in model space to provide height samples, said locations forming vertices of substantially square trapezoidal shapes in model space, said shapes increasing in size with increasing radial distance from said centered viewpoint in model space, but being substantially uniform in image space;

processing picture elements in relation to said viewpoint based on said radial form height field to provide perspective display data; and driving a display in accordance with said perspective display data to provide said perspective image.

2. A process according to claim 1 wherein said step of sampling said height field data includes defining a system of azimuth and range coordinates such that adjacent sets of said coordinate points define said substantially square trapezoidal shapes.

3. A process according to claim 1 wherein said step of processing picture elements includes defining and interconnecting a system of azimuth and range coordinates to provide polygons.

4. A process according to claim 3 wherein said polygons are defined as triangles.

5. A process according to claim 3 wherein said picture elements are processed by combining values selectively from said polygons proximate each picture element.

6. A process according to claim 1 wherein said step of processing said picture elements further includes texturing said picture elements.

7. A process according to claim 1 wherein said step of processing said picture elements further includes shading said picture elements.

8. A process according to claim 1 wherein said step of processing said picture elements further includes scan converting said picture elements to a raster display format.

9. A process according to claim 1 wherein said step of sampling said height field data includes defining a system of azimuth and range coordinates such that adjacent sets of said coordinate points define said substantially square trapezoidal shapes to provide polygons and wherein said picture elements are processed by combining values selectively from said polygons proximate each picture element and further, texturing said picture elements, shading said picture elements and scan converting said picture elements.

10. A system for producing perspective images having a foreground and a background with respect to a selected viewpoint, as of a terrain, comprising:

memory means for storing a height field, as to represent a terrain;

radial means for providing radial height field data from said memory means in a re-sampled radial coordinate form, said re-sampled radial coordinate form providing a relatively greater level of detail for said foreground and a relatively lesser level of detail for said background and defining:
   rays extending radially from said viewpoint in model space, said rays being substantially parallel in image space; and
   selected re-sampling locations along said rays in model space providing re-sampled heights, said locations forming vertices of substantially square trapezoidal shapes in model space, said shapes increasing in size with increasing radial distance from said centered viewpoint in model space, but being substantially uniform in image space;
an image generator means including a pixel processor for receiving said radial height field data from said radial means to formulate display pixel data indicative of said height field with respect to said selected viewpoint; and
display means for receiving said display pixel data to display said perspective representation.

11. A system according to claim 10 wherein said radial means comprises means to access said memory means to receive height field data and re-sample said height field data into radial height field data based on azimuth and range coordinates.

12. A system according to claim 11 wherein said radial means further includes means for blending values of said height field data to provide values of said radial height field data.

13. A system according to claim 10 wherein said image generator means includes means to formulate polygons representative of terrain skin whereby to formulate said display pixel data.

14. A system according to claim 13 wherein said image generator means further includes means to texture said display pixel data.

15. A system according to claim 13 wherein said image generator means further includes means to shade said display pixel data.

16. A system according to claim 13 wherein said image generator means further includes means to scan convert said display pixel data.

17. A system according to claim 13 wherein said image generator means further includes means for processing individual pixels for said perspective representation with respect to said polygons contiguous to each pixel.

18. A system according to claim 17 wherein said image generator means further includes filter means for blending values from said polygons.

19. A process according to claim 1 wherein said height samples form vertices of polygons in image space, said image space being defined by a THETA/PHI coordinate system and said step of processing picture elements includes scan-converting said polygons using a PHI-directional filter.

20. A process according to claim 19 wherein radial edges of said polygons are in alignment with said rays in said THETA/PHI image space.

21. A process according to claim 20 wherein said step of processing picture elements includes texturing said polygons in accordance with said radial edges of said polygons.

22. A process according to claim 20 wherein said step of processing picture elements includes rendering anti-aliased ridgelines in said image space in accordance with said radial edges of said polygons.

23. A process according to claim 21 wherein said step of texturing involves MIP-map, an appropriate level of which is selected in accordance with said radial edges of said polygons.

24. A process according to claim 22 wherein said step of rendering anti-aliased ridgelines includes generating a PHI list based on said radial edges of said polygons.

25. A process according to claim 1 wherein said height samples form vertices of polygons in image space defined by a THETA/PHI coordinate system and said step of processing said picture elements includes determining which of said polygons influence said picture elements.

26. A process according to claim 1 wherein said height samples are addressed in a THETA/PHI coordinate system and each includes an X-Y position in said height field data and a filtered Z-height.

* * * * *

UNITED STATES PATENT AND TRADEMARK OFFICE
CERTIFICATE OF CORRECTION

PATENT NO. : 5,579,456  
DATED : November 26, 1996  
INVENTOR(S) : Michael A. Cosman Page 1 of 2

It is certified that error appears in the above-indentified patent and that said Letters Patent is hereby corrected as shown below:

Column 2, line 26, delete "FIG." and replace with --FIGS.--;

Column 2, line 47, delete "FIG." and replace with --FIGS.--;

Column 2, line 49, delete "FIG." and replace with --FIGS.--;

Column 2, line 54, delete "FIG." and replace with --FIGS.--;

Column 4, line 27, delete "," after "any";

Column 5, line 41, delete "course" and replace with --coarse--;

Column 6, line 12, delete "," after "display";

Column 8, line 33, delete second ")" and replace with --,--;

Column 8, line 34, delete second ")" and replace with --,--;

Column 10, line 23, delete "." after "Accordingly";

Column 13, line 47, delete "an" and replace with --and--;

Column 15, line 66, delete "FIG." and replace with --FIGS.--;

Column 16, line 1, delete "FIG." and replace with --FIGS.--;

UNITED STATES PATENT AND TRADEMARK OFFICE
CERTIFICATE OF CORRECTION

PATENT NO. : 5,579,456
DATED : November 26, 1996
INVENTOR(S) : Michael A. Cosman It is certified that error appears in the above-identified patent and that said Letters Patent is hereby corrected as shown below:

Column 17, lines 30-31, delete "the processing each ray" and replace with --and each ray can be processed--;

Column 17, line 35, delete "way" and replace with --ray--;

Column 18, line 1, delete "re" and replace with --are--;

Signed and Sealed this

Third Day of March, 1998

Attest:

BRUCE LEHMAN

Attesting Officer     Commissioner of Patents and Trademarks